Dec. 25, 1928.

E. M. SCOVILLE 1,696,737

GREASE CUP

Filed May 5, 1927

Inventor
E. M. Scoville
by W. H. Lieber
Attorney

Patented Dec. 25, 1928.

1,696,737

UNITED STATES PATENT OFFICE.

EUGENE M. SCOVILLE, OF CINCINNATI, OHIO, ASSIGNOR OF ONE-HALF TO FLOYD L. SWANBERG, OF PITTSBURGH, PENNSYLVANIA.

GREASE CUP.

Application filed May 5, 1927. Serial No. 188,949.

This invention relates in general to improvements in the art of lubrication, and relates more specifically to improvements in the construction and operation of pressure actuated grease cups or the like.

An object of the invention is to provide relatively simple, compact and efficient mechanism for automatically delivering semi-fluent substances such as grease, in regulated quantities, to a source of utilization. Another object of the invention is to provide a new and useful automatic pressure actuated grease cup which may be effectively operated from a remote source of controllable pressure. A further object of the invention is to provide a grease supplying device normally operable with oil under pressure, wherein the actuating oil may be used as a lubricant in case the grease supply fails. Still another object of the invention is to provide a grease cup structure which may be readily manufactured, assembled, dismantled or adjusted, and which may be conveniently recharged with lubricant, when empty. These and other objects and advantages of the invention will be apparent from the following description.

A clear conception of an embodiment of the improvement and of the mode of constructing and operating devices in accordance therewith, may be had by referring to the drawing accompanying and forming a part of this specification in which the various elements are referred to with suitable characters.

Figures 1, 2:
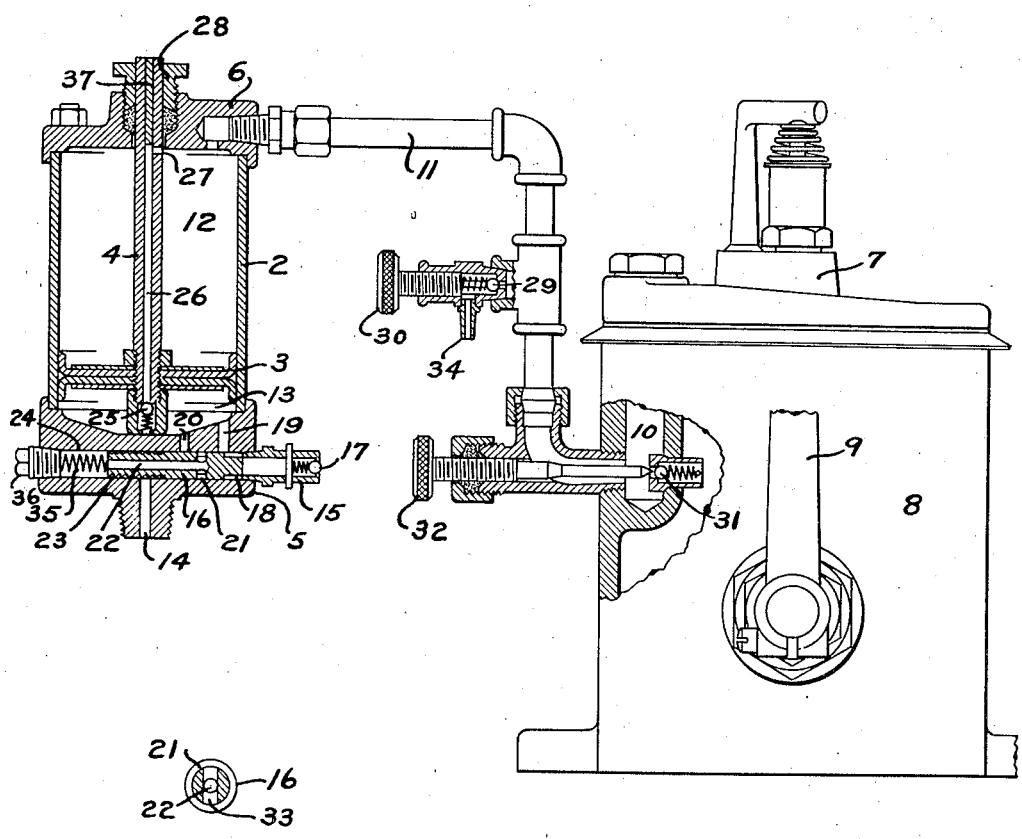
Fig. 1 is a general assembly showing an improved grease cup in section, and also showing a force feed oil supply pump partly in section, operatively associated with the grease cup.
Fig. 2 is an enlarged transverse section through the grease discharge control plunger of the grease cup.

Referring specifically to Fig. 1 of the drawing, the improved lubricator comprises in general a pressure actuated grease cup, and a pump 7 or other suitable means for supplying oil under pressure to the grease cup. The oil pump 7 may be of ordinary construction, and, as specifically disclosed, is supported directly upon an oil supply reservoir 8 and is operable by means of an actuating lever 9. The oil pump discharge passage 10 communicates with a pipe 11 leading to the grease cup, the passage 10 also being communicable directly with the reservoir 8 past a check valve 31 which is normally spring pressed toward its seat but which may be held in open position and the port of which may be positively sealed, by means of a threaded spindle 32. The oil conducting pipe 11 may also be provided with an oil return valve 29 for permitting return of oil from the pipe 11 to the reservoir 8 through a connection associated with the fitting 34, and an adjustable spindle 30 may be provided in order to lock the valve 29 in closed position and to adjust the tension of the valve actuating spring when the valve is released.

The improved grease cup comprises a cylindrical casing 2 having a movable piston 3 therein. The casing 2 is supported upon a base 5 and has a cap 6 detachably associated with the upper end thereof to which the oil pipe 11 is connected. The piston 3 is movable between the base 5 and the cap 6, and has a piston rod 4 extending upwardly therefrom and slidable along a packing 28 associated with the cap 6. The piston rod 4 is provided with a central passage 26 the upper end of which is closed by a plug 37 and the lower end of which is communicable with the grease chamber 13 below the piston 3, past a spring pressed check valve 25. A transverse oil by-pass port 27 in the rod 4, is adapted to connect the passage 26 with the oil pressure chamber 12 above the piston 3, when the piston is in extreme lower position as shown in the drawing.

The base 5 is provided with a transverse through bore 24, one end of which is normally sealed by means of a pipe plug 36, and the opposite end of which is provided with a grease supply fitting 15 having a spring pressed check valve 17 therein. A plunger 16 snugly fits and is slidable within the bore 24, the plunger 16 being constantly urged toward the fitting 15 by means of a helical spring 35 one end of which coacts with the pipe plug 36 and the opposite end of which engages the plunger 16. A grease inlet port 19 formed in the base 5 connects the end of the bore 24 adjacent to the fitting 15 with the grease chamber 13, and a grease delivery port 20 likewise formed in the base 5 connects the chamber 13 with the bore 24 nearer to the central axis of the cup. The plunger 16 has a reduced end adapted to abut against the end of the fitting 15 and forming an annular space 18 which is constantly in communication with the chamber 13 through the port 19. The medial portion of the plunger 16 is provided with an annular recess 21 communicating with a central passage 22 in the plunger, through lateral passages 33 as shown in Fig. 3, the recess 21 being communicable under certain conditions of operation, with the grease delivery port 20. The exterior of the plunger 16 surrounding the hollow portion thereof, is provided with a helical groove or screw thread 23 which is communicable with a final grease discharge port 14 formed in the base 5 and leading from the bore 24 to the source of utilization of the grease.

When it is desired to utilize the pressure actuated grease cup, the apparatus should first be charged with grease by applying a grease gun at the fitting 15. If the oil chamber 12 is filled with oil, and no check valve 31 is provided, the return valve 29 should first be released by manipulation of the spindle 30, before the cup is charged with grease. If the apparatus is provided with both check valves 29, 31 as shown, then the return valve 29 may be retained in closed position, and the threaded spindle 32 may be withdrawn to permit the valve 31 to return the oil directly to the reservoir. As the grease is forced past the check valve 17 and through the fitting 15, the plunger 16 is moved toward the left as viewed in Fig. 1, and the entering grease flows around the space 18 and through the supply port 19 into the chamber 13 thereby elevating the piston 3 and forcing the oil from the chamber 12 through the pipe 11 and past the effective return valve 29 or 31 into the reservoir 8. When the grease chamber 13 has been completely filled, the piston 3 is in uppermost position and the grease cup is ready for operation.

During normal operation of the apparatus, the pump 7 is operated as desired, to force oil from the reservoir 8 through the pipe 11 into the chamber 12 at a predetermined rate. The oil thus admitted establishes a pressure downwardly upon the piston 3 and places the grease within the chamber 13 under pressure. The grease under pressure acts through the port 19 and space 18, upon the annular exposed end surface of the plunger 16 and subsequently upon the entire end surface thereof, and shifts the plunger 16 to the left against the spring 35 until the recess 21 is placed in communication with the delivery port 20. Grease is then free to flow through the ports 33 and through the passage 22 into the space at the left of the plunger 16, and from this space along the screw thread 23 and through the port 14 to the source of utilization. When the grease pressure within the bore 24 at the left of the plunger 16 becomes equal to that at the opposite end of the plunger, the spring 35 becomes effective to move the plunger 16 toward the right thereby momentarily checking the discharge of grease. When the pressure again builds up at the right end of the plunger 16 to an extent sufficient to overcome the spring pressure at the left end, the plunger is again shifted to permit discharge of grease in the manner described. In this way a balanced pressure condition is automatically attained, whereby a substantially constant supply of grease is delivered from the chamber 13 through the final discharge port 14, the quantity of grease delivered being proportional to the rate of delivery of oil by the pump 7. The oil admitted to the chamber 12 causes the piston 3 to gradually advance toward the base 5 as the grease is discharged, until all of the grease has been delivered. In the event that the attendant fails to replenish the chamber 13 with grease when the piston has advanced to the end of its stroke as shown in Fig. 1, oil is eventually forced through the port 27 and passage 26 and past the valve 25 into the grease chamber 13, thereby furnishing oil in place of the depleted grease supply, until recharging with grease is effected. The apparatus thus functions automatically as a safety device in order to insure delivery of a lubricant to the source of utilization even after the grease supply has been exhausted.

By properly controlling the source of oil supply, any desired rate of delivery of grease may obviously be obtained. The pump 7 may be located any desired distance from the grease cup without interfering with the operation of the latter. The various elements of the mechanism may be readily manufactured with the aid of simple tools such as a lathe and a drill press, and may be conveniently assembled, dismantled and adjusted. The passages 26, 22, the ports 14, 27, 19, 20, 21, and the bore 24 may all be formed with a drill, and the fitting 15 may be a standard fitting such as is customarily used on automobiles. The grease cup is extremely simple and compact and has proven highly efficient in commercial operation. The grease cup may also set in any desired position without interfering with the operation as herein described. It will also be apparent that the sinuous passage afforded by the various ports, passages and screw thread through which the grease must be forced, effectively retard the free flow of the grease and provide uniform constant delivery thereof.

It should be understood that it is not desired to limit the invention to the exact details of construction and to the precise mode of operation, as various modifications may occur to persons skilled in the art.

It is claimed and desired to secure by Letters Patent:—

1. In combination, means forming a grease chamber, a piston movable within said chamber, automatically operable means for applying oil under pressure from a remote source to one face of said piston to subject the grease in said chamber to pressure, a discharge port communicating with said chamber, and a plunger movable transversely across said port and operable by the pressure upon the grease in said chamber to control the delivery of grease through said port.

2. In combination, a casing forming a grease chamber, a pump independent of said casing for subjecting the grease in said chamber to pressure, an inlet port for supplying grease to said chamber, a discharge port for delivering grease from said chamber, and means operable through said inlet port by the pressure upon the grease in said chamber to vary the delivery of grease through said discharge port in accordance with variations in the pressure created by said pump.

3. In combination, means forming a grease chamber, a pump independent of said means for subjecting the grease in said chamber to pressure, an inlet port for supplying grease to said chamber, a discharge port for delivering grease from said chamber, and a plunger operable through said inlet port by the pressure upon the grease in said chambers and movable transversely across said discharge port to vary the delivery of grease therethrough in accordance with variations in the pressure created by said pump.

4. In combination, means forming a grease chamber, means including a movable member for utilizing oil under pressure to deliver grease from said chamber, and means including a by-pass for automatically introducing said oil into said chamber from one side of said member to the other and thence to the point of delivery when the grease supply is exhausted.

5. In combination, means forming a grease chamber, a piston within said chamber, means for applying oil under pressure to said piston to deliver grease from said chamber, and means including a by-pass for automatically introducing said oil into said chamber through said piston and thence to the point of delivery only when said piston has reached the end of its stroke.

6. In combination, a cylinder, a piston dividing said cylinder into two chambers, means for introducing grease into said cylinder on one side of said piston, means for introducing oil into said cylinder on the opposite side of said piston to cause said piston to deliver said grease from said cylinder, and means including a by-pass for causing said oil to automatically flow on both sides of said piston and thence to the point of delivery when all of said grease has been discharged.

7. In combination, a cylinder, a piston dividing said cylinder into two chambers, means for introducing grease into one of said chambers, a pump for introducing oil under pressure from a source of supply into the other of said chambers to move said piston and to discharge said grease, and means for permitting free discharge of oil from said other chamber to said source when grease is introduced into said cylinder.

8. In combination, a cylinder, a piston movable within said cylinder, means for introducing grease into said cylinder on one side of said piston, means for introducing oil under pressure to said cylinder on the opposite side of said piston, means for effecting free escape of grease from said cylinder when said piston is moved in one direction, and means for effecting free escape of oil from said cylinder when said piston is moved in the opposite direction.

9. In combination, a cylinder, a piston movable within said cylinder, means for introducing grease into said cylinder on one side of said piston, means for introducing oil under pressure to said cylinder on the opposite side of said piston, means for effecting free escape of grease and oil from said cylinder when said piston is moved in opposite directions, and means for by-passing oil around said piston when the grease supply is depleted.

10. In combination, means forming a grease chamber, and a plunger automatically operable by the pressure of grease in said chamber for controlling the delivery of grease from said chamber, said plunger having an external screw thread of variable effective length for retarding the delivery of grease from said chamber.

11. In combination, a casing forming a chamber and having a bore at an end thereof, and a plunger automatically slidable within said bore by the pressure of grease in said chamber to control the delivery of grease from said chamber, said plunger having an external screw thread of variable effective length cooperable with said bore to retard the delivery of grease from said chamber.

In testimony whereof, the signature of the inventor is affixed hereto.

EUGENE M. SCOVILLE.